US005961895A

United States Patent [19]

Sanford

[11] Patent Number: 5,961,895

[45] Date of Patent: Oct. 5, 1999

[54] MULTI-STAGE SYSTEM FOR MICROBUBBLE PRODUCTION

[75] Inventor: Matthew J. Sanford, Bel Alton, Md.

[73] Assignee: The United States of America as represented by the Secretary of the Navy, Washington, D.C.

[21] Appl. No.: 08/879,120

[22] Filed: Jun. 19, 1997

[51] Int. Cl.$^{6}$ .................................................... B01D 47/00

[52] U.S. Cl. ........................ 261/36.1; 261/77; 261/121.1; 261/122.1; 261/DIG. 75

[58] Field of Search .............................. 261/29, 36.1, 77, 261/121.1, 122.1, 123, 125, 126, DIG. 75

[56] References Cited

U.S. PATENT DOCUMENTS

| | | | |
|---|---|---|---|
| 2,151,547 | 3/1939 | Auerbach | 261/121.1 |
| 3,246,885 | 4/1966 | Stevens | 261/77 |
| 3,640,516 | 2/1972 | Willinger | 261/121 |
| 4,211,733 | 7/1980 | Chang | 261/123 |
| 4,639,340 | 1/1987 | Garrett | 261/36.1 |
| 4,857,350 | 8/1989 | Iwasaki et al. | 426/506 |
| 5,080,868 | 1/1992 | Elgas | 422/99 |
| 5,122,312 | 6/1992 | Tomalesky | 261/122 |
| 5,230,838 | 7/1993 | Oaki et al. | 261/122 |
| 5,534,143 | 7/1996 | Portier et al. | 210/151 |

FOREIGN PATENT DOCUMENTS

| | | | |
|---|---|---|---|
| 1360756 | 4/1964 | France | 261/77 |
| 467359 | 6/1937 | United Kingdom | 261/77 |

*Primary Examiner*—Jay H. Woo
*Assistant Examiner*—Robert A. Hopkins
*Attorney, Agent, or Firm*—James B. Bechtel, Esq.

[57] ABSTRACT

A multi-stage system produces microbubbles in a liquid. A first bubble producing stage generates bubbles of a first size range. At least one additional bubble producing stage has an inlet positioned in the liquid for capturing bubbles in the first size range. Each additional bubble producing stage terminates in an outlet and includes a pump. Each pump generates a pressure increase between the inlet and its outlet and generates a pressure drop across the respective outlet. As a result, bubbles of a second size range exit each outlet where the second size range defines bubble sizes that are smaller than bubble sizes defined by the first size range.

7 Claims, 3 Drawing Sheets

MULTI-STAGE SYSTEM FOR MICROBUBBLE PRODUCTION

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to the production of gas microbubbles in a liquid, and more particularly to a multi-stage microbubble production system for generating gas microbubbles having diameters of approximately 100 micrometers (microns) or less.

BACKGROUND OF THE INVENTION

The distribution of gas in a liquid in the form of extremely small microbubbles, i.e., on the order of 100 micrometers (microns) or less, is important to a variety of applications. For example, the introduction of microbubbles at the boundary layer of a fluid moving through a pipe or over a ship's hull is used to reduce drag forces. Also, research on bubble coalescence in salt water is of value to the Navy because small microbubbles created in a ship's wake remain in suspension in seawater for a long time. These small microbubbles can be detected by a variety of means from above and below the water's surface thereby making a ship's track easy to detect and follow. Accordingly, the Navy is researching a variety of ways to reduce or eliminate the small microbubbles from a ship's wake. One approach is based on the coalescence of small microbubbles to form larger microbubbles that then quickly rise the water's surface where they can disperse into the air. Therefore, in such research, it is desirable to produce large quantities of small microbubbles in order to study bubble coalescence techniques.

Prior art methods of producing microbubbles include the injection or blowing of gas into a liquid through a plate of porous material (e.g., ceramic, mesh, wood, glass frit, polymer, etc.) or through a hollow needle. However, these simple approaches produce bubbles over a wide range of sizes (e.g., 250–1000 microns in diameter) and very few small microbubbles having diameters of 100 microns or less.

A more complex microbubble generator capable of producing bubbles ranging from 250–1000 microns in diameter is disclosed in U.S. Pat. No. 5,534,143. One embodiment of the invention includes a chamber packed with small inert particles through which a liquid effluent and oxygen or other gas are admitted under pressure to produce relatively large bubbles. A venturi chamber is positioned to then receive the large bubbles in the liquid effluent and oxygen to further reduce the size of the bubbles to between 250–1000 microns. However, the disclosed embodiment produces few bubbles that are 100 microns or less in size. Further, the set-up must be positioned close to where the bubbles are needed and may therefore not be suitable for use in pipe arrangements or near a ship's hull.

Another approach relies on the injection of a liquid into a liquid using a narrow jet at a gas/liquid interface in order to entrap gas into the flow of liquid therethrough. However, this approach is sensitive to set-up variations where even small variations cause a big variation in bubble quantity and their size range.

Still another approach involves the electrolysis of a liquid. While this method can produce large quantities of small microbubbles of 100 microns or less, it only works in certain liquids and solutions. In addition, the gas formed is a function of the electrolysis process and therefore cannot be selected. Still further, the noble metal wire required by the method can greatly add to the cost of a large scale bubble production apparatus.

SUMMARY OF THE INVENTION

Accordingly, it is an object of the present invention to provide a system for producing a large quantity of extremely small microbubbles in a liquid.

Another object of the present invention is to provide a microbubble production system where the microbubbles have diameters of approximately 100 microns or less.

Still another object of the present invention is to provide a system for producing extremely small microbubbles simply and inexpensively.

Other objects and advantages of the present invention will become more obvious hereinafter in the specification and drawings.

In accordance with the present invention, a multi-stage system produces microbubbles in a liquid. A first bubble producing stage generates bubbles of a first size range in a liquid. At least one additional bubble producing stage has an inlet positioned in the liquid for capturing bubbles in the first size range. Each of the one or more additional bubble producing stage terminates in an outlet and includes a pump. Each pump generates a pressure increase between the inlet and its outlet and generates a pressure drop across the respective outlet. As a result, bubbles of a second size range exit each outlet where the second size range defines bubble sizes that are smaller than bubble sizes defined by the first size range. All bubbles could be produced in the same liquid, or the bubbles in the first size range could be produced in a first liquid while the bubbles in the second size range could be produced in a second liquid.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
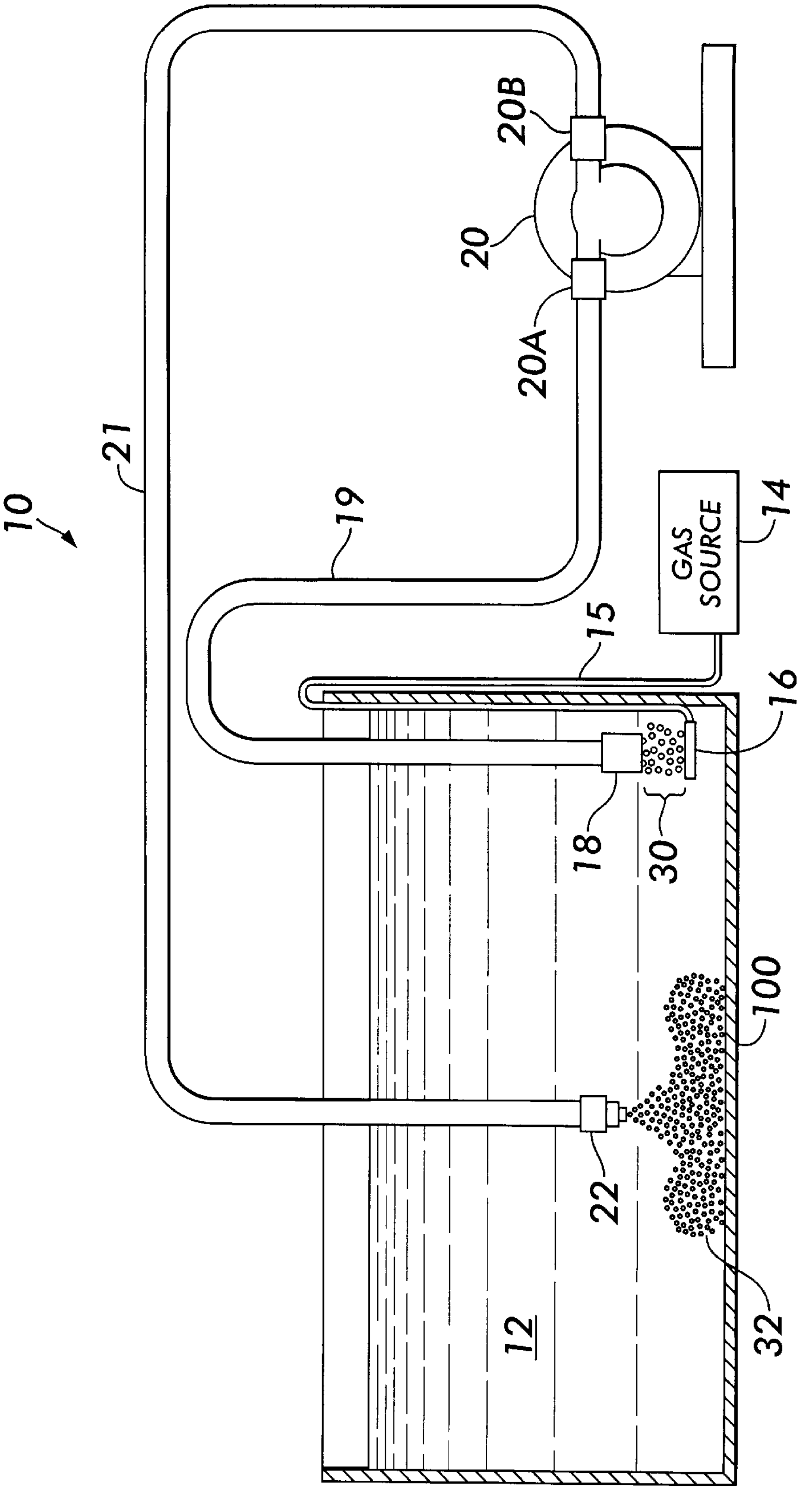
FIG. 1 is a schematic diagram of one embodiment of the multi-stage microbubble production system according to the present invention.

Referring now to the drawings, and more particularly to FIG. 1, one embodiment of a multi-stage microbubble production system is shown and referenced generally by the numeral 10. System 10 includes a liquid 12; a gas source 14 (e.g., a tank of pressurized gas or air, an air pump, etc.); a porous material 16 such as a metal or glass frit located in liquid 12 and coupled to gas source 14 via (for example)

conduit 15; an intake 18 located in liquid 12 near frit 16; a pump 20 with its intake or low pressure side 20A coupled to intake 18 via (for example) conduit 19; and a nozzle 22 coupled to the outlet or high pressure side 20B of pump 20 via (for example) conduit 21. For purpose of illustration, liquid 12 is shown within a container 100. However, this need not be the case as will become apparent below.

In operation, gas source 14 supplies pressurized gas or air to frit 16 via conduit 15. As the pressurized gas or air passes through frit 16, bubbles 30 of a first size range are produced in liquid 12. When pump 20 is activated, a vacuum is created at intake 18 whereby many of bubbles 30 and some of liquid 12 are drawn into intake 18. In terms of ultimately producing microbubbles having diameters of 100 microns or less, frit 16 is selected such that bubbles 30 will generally have diameters ranging between 500–1000 microns or greater. In this size range, bubbles 30 will tend to easily rise in liquid 12. Accordingly, when intake 18 is positioned over the top of frit 16, substantially all of bubbles 30 can be captured by intake 18 when pump 20 is activated.

The mixture of liquid 12 and bubbles 30 drawn into intake 18 are sucked into pump 20 via conduit 19 where such mixture experiences an increase in pressure as it is forced through conduit 21 towards nozzle 22. As the mixture of liquid 12 and bubbles 30 is forced through nozzle 22, the mixture experiences both a pressure drop and an increase in velocity. This creates a turbulence in nozzle 22 which causes a breakdown of bubbles 30 with respect to their size. As a result, the mixture of liquid 12 and bubbles 30 (drawn at intake 18) is converted to a microbubble cloud 32 in liquid 12 at the outlet of nozzle 22. The air or gas microbubbles in cloud 32 are in a size range that is greatly reduced relative to the size range of bubbles 30. Variations in the size or quantity of bubbles 30 and the design of nozzle 22 can be made in order to vary the size of the bubbles in cloud 32.

In terms of producing large quantities of microbubbles having diameters of 100 microns or less in a liquid 12 such as seawater or fresh water, system 10 can be configured, for example, using a small air pump for gas source 14 and a glass frit having a porosity of approximately 40–60 micrometers for frit 16. Pump 20 can be an inexpensive rubber vane impeller type pump operating at a speed of approximately 1725 RPM and nozzle 22 can be a dispersing spray nozzle. The above-described configuration has been shown to be capable of producing microbubbles at the outlet of nozzle 22 in the size range of 10–70 microns. Bubble concentrations in excess of 300,000 bubbles per cubic inch were achieved when liquid 12 was seawater and bubble concentrations in excess of 45,000 bubbles per cubic inch were achieved when liquid 12 was fresh water. These results compare favorably to prior art methods of bubble production in terms of bubble size, quantity of bubbles, cost of apparatus, complexity of apparatus and/or ability to scale the size of the apparatus up or down for a particular application.

Figure 2:
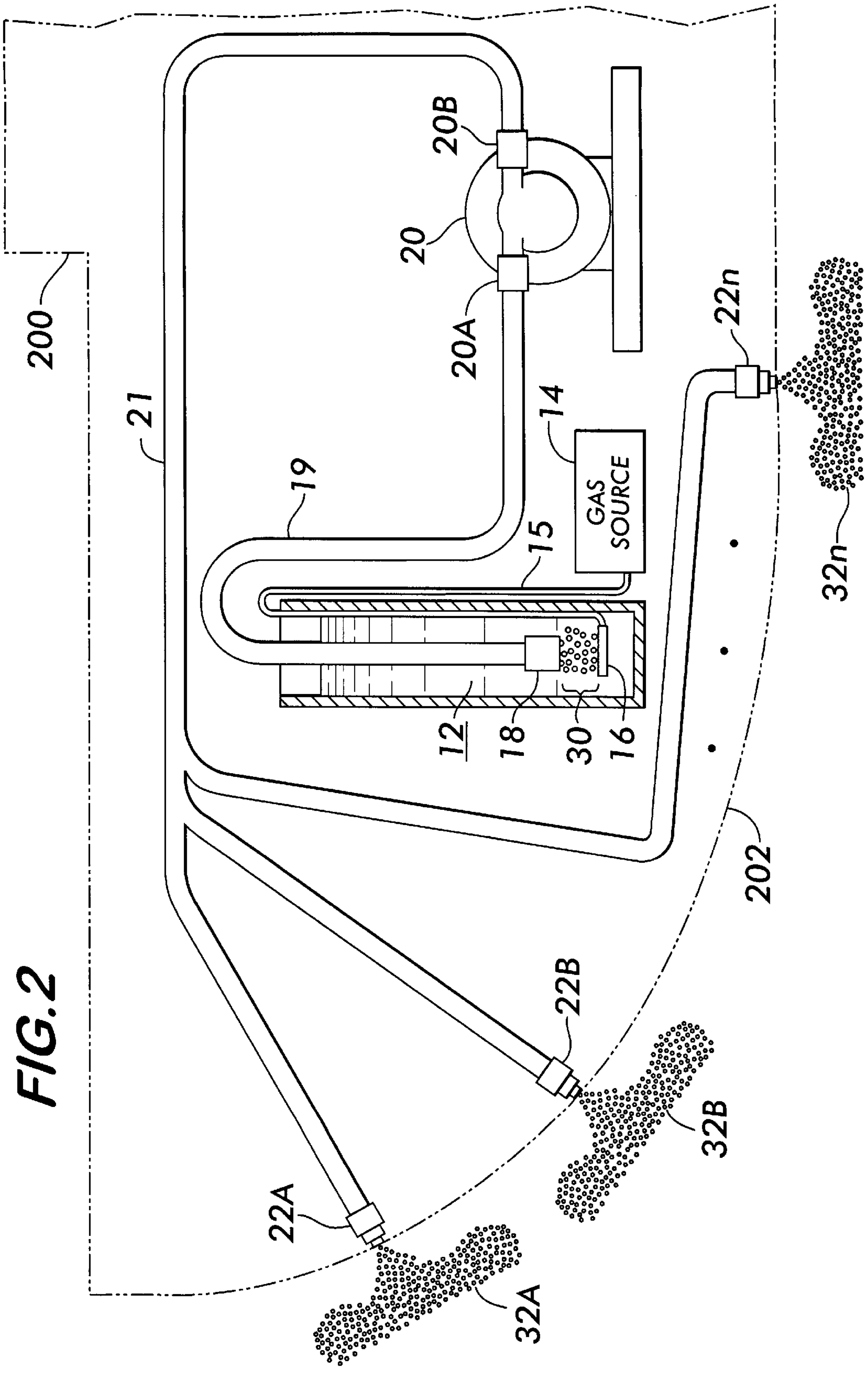
FIG. 2 is a schematic diagram of the multi-stage microbubble production system configured for use onboard a ship.

As mentioned above, the present invention is not limited to the set-up depicted in FIG. 1. For example, in FIG. 2, the present invention is installed onboard a ship 200 (shown in portion) where production of a microbubble cloud is used to reduce drag forces experienced at various places on the ship's hull 202 as is known in the art. Since only the nozzle need be located at hull 202, the remaining components of the microbubble production system can be positioned where convenient on ship 200. In addition, the present invention could use multiple nozzles 22A, . . . , 22*n* positioned along hull 202 (e.g., from the port to starboard sides of the hull and/or from the bow to stern ends of the hull as shown). Each nozzle could be configured to produce a corresponding cloud 32A, . . . , 32*n* of microbubbles where the size of microbubbles in each cloud are smaller than bubbles 30 but in a size range designed for optimum drag reduction at the particular location on hull 202.

Figure 3:
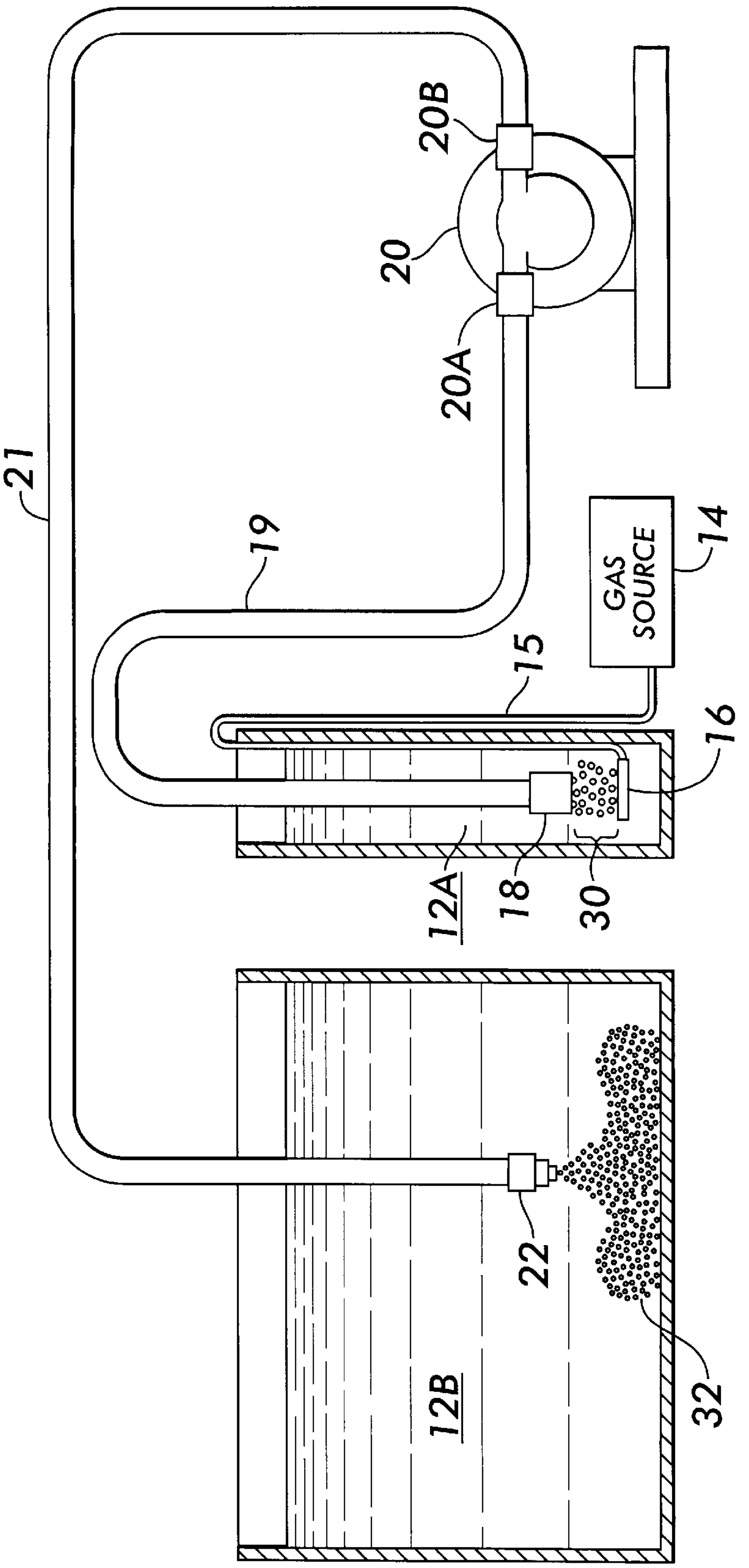
FIG. 3 is a schematic diagram of another embodiment of the multi-stage microbubble production system in which two different liquids are used.

Although the invention has been described relative to the production of bubbles 30 and cloud 32 in the same liquid, the present invention is not so limited. As shown in FIG. 3, the system of the present invention could be used in situations where the larger bubbles 30 are produced in a first liquid 12A and the smaller microbubbles in cloud 32 are produced in a second liquid 12B. Thus, the present invention could find use in a washing machine where first liquid 12A is a soap solution and second liquid 12B is water in the machine's tub. The set-up in FIG. 3 could also be useful if first liquid 12A and second liquid 12B are fresh water. If higher concentrations of microbubbles in cloud 32 are needed, an additive (e.g., a surfactant such as detergents, wetting agents and emulsifiers to name a few) could be included in first liquid 12A in order to lower surface tension. Still further, the set-up in FIG. 3 would be useful if a three-way chemical reaction involved the mixing of a gas and two liquids whereby the gas must first be mixed with first liquid 12A prior to being mixed with second liquid 12B.

The advantages of the present invention are numerous. Regardless of configuration, the set-up of the system is simple, inexpensive and repeatable. The system can be scaled to any size application using standard off-the-shelf components. The microbubbles produced at the outlet of the nozzle(s) are uniform in size and large in quantity. The system can be used with a large variety of gases and liquids. The system can be configured for applications such as bubble research, chemical manufacturing, water aeration, and viscous drag reduction for watercraft or piping systems.

Although the invention has been described relative to specific embodiments thereof, there are numerous other variations and modifications that will be readily apparent to those skilled in the art in light of the above teachings. For example, the larger sized bubbles 30 could be distributed to a plurality of pump 20 and nozzle 22 combinations with each combination configured to produce a microbubble cloud having specified properties, e.g., microbubble size, quantity of bubbles, etc. The present invention could also be adapted to thoroughly mix an ingredient (e.g., a fluid, small particles such as paint pigment, etc.) into a fluid whereby a small amount of the ingredient must be added and mixed well with a large container of the fluid. In such a situation, the embodiment of FIG. 1 could be used. The ingredient to be added would be injected instead of air bubbles. Mixing can be achieved at nozzle 22 while the thoroughness of mixing is guaranteed over time by the recirculating nature of the set-up. It is therefore to be understood that, within the scope of the appended claims, the invention may be practiced other than as specifically described.

What is claimed as new and desired to be secured by Letters Patent of the United States is:

1. A system for producing microbubbles in liquid, comprising:

a first bubble producing stage for generating bubbles of a first size range in a first liquid;

a pump having an intake side and an outlet side, said intake side being coupled to a region in said first liquid for capturing substantially all of said bubbles of said first size range; and at least one nozzle having an input and an output for producing a pressure drop and an increase in velocity at said output relative to said input, said at least one nozzle immersed in a second liquid and coupled to said outlet side of said pump, wherein said pump pressurizes said bubbles of said first size range drawn therethrough for delivery to said at least one nozzle, and wherein said at least one nozzle outputs bubbles of a second size range, said second size range defining bubble sizes that are smaller than bubble sizes defined by said first size range.

2. A system as in claim 1 wherein said at least one nozzle comprises a plurality of nozzles, each of said plurality of nozzles outputting bubbles in said second size range.

3. A system as in claim 1 wherein said at least one nozzle comprises a plurality of nozzles, each of said plurality of nozzles occupying a specific position and selected to output bubbles of a size within said second size range for performing a specific function at each said specific position.

4. A system for producing gas microbubbles having diameters of approximately 100 microns or less, said system comprising:

an air pump producing pressurized air;

a first liquid;

a frit immersed in said first liquid and coupled to said air pump for receiving said pressurized air wherein bubbles having diameters that are approximately 500 microns or larger are produced in said first liquid as said pressurized air passes through said frit;

a liquid pump having an intake side and an outlet side, said intake side being coupled to a region in said first liquid above said frit such that, when said liquid pump is activated, substantially all of said bubbles are drawn with said first liquid through said liquid pump;

a second liquid; and a nozzle coupled to said outlet side of said liquid pump, said nozzle immersed in said second liquid, said nozzle having an input and an output for producing a pressure drop and an increase in velocity at said output relative to said input, wherein said liquid pump pressurizes said bubbles drawn therethrough with said first liquid for delivery to said nozzle, and wherein output from said nozzle in said second liquid includes gas microbubbles having diameters that are approximately 100 microns or less.

5. A system as in claim 4 wherein said first liquid is the same as said second liquid.

6. A system as in claim 4 wherein said first liquid and said second liquid are seawater.

7. A system as in claim 4 wherein said first liquid is different than said second liquid.

* * * * *